US011879283B2

(12) United States Patent
Duer

(10) Patent No.: US 11,879,283 B2
(45) Date of Patent: Jan. 23, 2024

(54) ARRANGEMENT FOR GUIDING A SLIDING DOOR

(71) Applicant: Julius Blum GmbH, Hoechst (AT)

(72) Inventor: Stefan Duer, Schwarzach (AT)

(73) Assignee: Julius Blum GmbH, Hoechst (AT)

( * ) Notice: Subject to any disclaimer, the term of this patent is extended or adjusted under 35 U.S.C. 154(b) by 276 days.

(21) Appl. No.: 17/316,192

(22) Filed: May 10, 2021

(65) Prior Publication Data

US 2021/0262262 A1 Aug. 26, 2021

Related U.S. Application Data

(63) Continuation of application No. PCT/AT2019/060364, filed on Nov. 5, 2019.

(30) Foreign Application Priority Data

Nov. 13, 2018 (AT) .............................. A 50982/2018

(51) Int. Cl.
*E05D 15/06* (2006.01)

(52) U.S. Cl.
CPC ....... *E05D 15/063* (2013.01); *E05D 15/0621* (2013.01); *E05Y 2900/132* (2013.01)

(58) Field of Classification Search
CPC .............. E05D 15/063; E05D 15/0626; E05D 15/0634; E05D 15/0639; E05D 15/0643; E05D 15/0621; Y10T 16/364; Y10T 16/35
See application file for complete search history.

(56) References Cited

U.S. PATENT DOCUMENTS 1,674,748 A * 6/1928 Tobin .................... E05D 15/063 16/97
2,566,522 A * 9/1951 Hezlep, Jr. ............ E05D 15/063 16/105

(Continued)

FOREIGN PATENT DOCUMENTS

CN 102561866 7/2012
CN 103912195 7/2014

(Continued)

OTHER PUBLICATIONS

International Search Report dated Feb. 3, 2020 in International (PCT) Application No. PCT/AT2019/060364.

*Primary Examiner* — Justin B Rephann
(74) *Attorney, Agent, or Firm* — Wenderoth, Lind & Ponack, L.L.P.

(57) ABSTRACT

An arrangement includes a rail profile and a running carriage movably mounted relative to the rail profile in the longitudinal direction and to which a sliding door can be fastened. The running carriage has a rolling body, and the rail profile has a running surface extending in the longitudinal direction of the rail profile and supporting the rolling body. The rolling body is displaceable on the running surface transversely to the longitudinal direction of the rail profile. Therefore, the running carriage can be pivoted about a pivot axis extending substantially parallel to the longitudinal direction of the rail profile. The rail profile has a vertical web extending in the longitudinal direction and oriented substantially perpendicularly to the running surface. The running carriage can be pivoted about the pivot axis such that a distance from the vertical web increases under loading by the sliding door.

24 Claims, 5 Drawing Sheets

(56) References Cited

U.S. PATENT DOCUMENTS

| | | | | |
|---|---|---|---|---|
| 4,651,469 | A * | 3/1987 | Ngian | E05D 15/1021 49/411 |
| 6,142,082 | A * | 11/2000 | Burke | E05D 15/0665 105/377.09 |
| 8,336,972 | B2 | 12/2012 | Haab et al. | |
| 8,522,398 | B2 | 9/2013 | Haab et al. | |
| 10,829,972 | B2 | 11/2020 | Harari | |
| 10,876,340 | B2 | 12/2020 | Rupp et al. | |
| 2006/0230684 | A1* | 10/2006 | Poole | E05D 15/0634 49/409 |
| 2010/0037427 | A1* | 2/2010 | Burgess, III | E05D 15/0639 16/97 |
| 2010/0269291 | A1 | 10/2010 | Haab et al. | |
| 2010/0270898 | A1 | 10/2010 | Haab et al. | |
| 2011/0209306 | A1* | 9/2011 | Pritz | E05D 15/0626 16/91 |
| 2012/0186046 | A1* | 7/2012 | Pelekanos | E05D 15/26 16/87 R |
| 2013/0020035 | A1* | 1/2013 | Pelakanos | E05D 15/0639 160/181 |
| 2015/0026928 | A1* | 1/2015 | Haab | E05F 1/16 16/96 R |
| 2016/0340951 | A1* | 11/2016 | Andrén | E05D 15/063 |
| 2017/0027388 | A1* | 2/2017 | Schultz | E05D 15/0678 |
| 2019/0128035 | A1 | 5/2019 | Harari | |
| 2019/0330896 | A1 | 10/2019 | Rupp et al. | |

FOREIGN PATENT DOCUMENTS

| | | |
|---|---|---|
| CN | 106320906 | 1/2017 |
| CN | 108166899 | 6/2018 |
| DE | 564572 | 11/1932 |
| DE | 91 05 385.4 | 9/1991 |
| DE | 91 00 963.4 | 3/1992 |
| DE | 20 2017 101 296 | 11/2017 |
| EP | 2 246 509 | 11/2010 |
| EP | 2 754 811 | 7/2014 |
| EP | 2 907 720 | 8/2015 |
| JP | 57-172872 | 3/1956 |
| JP | 63-187686 | 12/1988 |
| TW | 201835434 | 10/2018 |
| WO | 2018/129574 | 7/2018 |

* cited by examiner

ARRANGEMENT FOR GUIDING A SLIDING DOOR

BACKGROUND OF THE INVENTION

The invention concerns an arrangement for guiding a sliding door including at least one rail profile and at least one carriage which is mounted displaceably relative to the at least one rail profile in the longitudinal direction and to which the sliding door can be fixed. The at least one carriage has at least one rolling body and the at least one rail profile has at least one running surface which extends in the longitudinal direction of the rail profile and on which the at least one rolling body is supported. The at least one rolling body is displaceable on the at least one running surface transversely to the longitudinal direction of the at least one rail profile so that the at least one carriage is pivotable about a pivot axis extending substantially parallel to the longitudinal direction of the at least one rail profile. The invention further concerns an article of furniture comprising at least one sliding door and at least one such arrangement.

FIG. 2 shows an arrangement 101 for guiding a sliding door according to the state of the art as a side view, wherein a portion marked by a circle is shown on an enlarged scale in the lower part of the Figure. The arrangement 101 has a rail profile 103 and a carriage 105 mounted displaceably relative thereto in the longitudinal direction which in this view is oriented normal to the plane of the sheet. In the upper region the carriage 105 has a rolling body 106 which is mounted about a vertical axis and which is supported on a running surface 107 of the rail profile 103, that surface extending in the longitudinal direction.

A sliding door can be fixed to the carriage 105 by way of a carriage hinge 118. The sliding door which is not shown in the drawing is connected in the upper region to the carriage hinge 118 and hangs downwardly. The sliding door is of great weight. Under the influence of the force of gravity the sliding door endeavors to pivot towards the right in the lower region. As a result the sliding door exerts a torque on the arrangement 101, as indicated by a curved arrow.

As can be seen from the enlarged view the rolling body 106 as a further consequence is pressed against the running surface 107 in the contact region 29. When the sliding door is in the same position without being moved over a prolonged period of time, for example several days, that results in flattening of the rolling body 106. If then the rolling body 106 is moved again along the rail profile 103 that results in a disadvantageous generation of noise, a rattling, due to that flattening of the rolling body. At the same time this can involve increased wear of the rolling body 106 and the rail profile 103.

DE 202017101296 U1 discloses a guide for a sliding door having angle compensation, in which there is provided a carriage having rollers, which is guided at the inside of the tubular guide path.

The object of the present invention is to provide an arrangement for guiding a sliding door, that is improved over the state of the art, as well as an article of furniture comprising at least one sliding door and at least one such improved arrangement, wherein in particular flattening of the rolling body is significantly reduced or entirely prevented.

SUMMARY OF THE INVENTION

The at least one rolling body is displaceable at the at least one running surface transversely relative to the longitudinal direction of the at least one rail profile so that the at least one carriage is pivotable about a pivot axis which extends substantially parallel to the longitudinal direction of the at least one rail profile.

In the arrangement according to the invention, the at least one rail profile has at least one vertical web which extends in the longitudinal direction and which is oriented substantially perpendicularly to the at least one running surface. The at least one carriage is pivotable about the pivot axis in such a way that a spacing relative to the at least one vertical web increases in a state of being loaded by the sliding door, and preferably the at least one vertical web delimits the at least one running surface transversely to the longitudinal direction of the at least one rail profile.

A basic idea is to deliberately allow a pivotal movement of the sliding door and therewith the carriage. In that case the at least one rolling body can be displaced on the at least one running surface transversely to the longitudinal direction of the at least one rail profile and therefore moves into the clear without being pressed against a web or the like. Flattening of the at least one rolling body can therefore not occur at all.

According to a preferred embodiment, the at least one running surface is at least region-wise of a concave configuration in cross-section and/or wherein the at least one rolling body has a peripheral surface, by way of which the at least one rolling body is at least region-wise supported on the at least one running surface and wherein the peripheral surface is at least region-wise of a convex configuration in cross-section. Those configurations—individually or in combination with each other—permit gentle displacement of the at least one rolling body on the running surface transversely to the longitudinal direction of the rail profile. The frictional forces are minimized without, upon a pivotal movement of the at least one carriage about the pivot axis, involving lifting of the at least one rolling body off the running surface and thus a breakdown in the force line.

In addition, it has proven to be advantageous if the at least one rail profile has at least one delimitation profile which delimits the at least one running surface transversely to the longitudinal direction of the at least one rail profile. That at least one delimitation profile is only intended for an unplanned overload situation to prevent the sliding door from hanging off. In regular operation, the at least one rolling body is not in contact with the at least one delimitation profile or is in contact only with a minimal pressure force.

It has proven to be advantageous if the at least one carriage is pivotable about the pivot axis in an angle range of +15° and −10°, preferably +10° and −5°, starting from a neutral position which the at least one carriage assumes at least in a state of being non-loaded by the sliding door. That relatively small pivotal movement is surprisingly already sufficient to prevent flattening of the at least one rolling body.

The at least one rolling body can have a substantially cylindrical configuration. Other rolling body shapes however are also possible.

Furthermore, the at least one rolling body can be mounted to the at least one carriage rotatably about an axis of rotation extending substantially perpendicularly to the pivot axis, wherein the axis of rotation in the mounted state is oriented substantially horizontally. In comparison with the state of the art shown in FIG. 2, the axis of rotation of the at least one rolling body is therefore turned through 90°.

According to a preferred embodiment, the at least one carriage has at least one load rolling body for supporting the weight of a sliding door fixed to the at least one carriage.

Preferably, the at least one load rolling body has a groove, particularly preferably a V-groove, in cross-section at the periphery. If the at least one load rolling body has a groove at its periphery, then the at least one load rolling body not only takes over a load-carrying function but can also be used for lateral guidance of the at least one carriage.

In this connection, it has proven to be advantageous if the at least one rail profile has at least one load-transmitting running surface at which the at least one load rolling body is supported. Preferably, the at least one load-transmitting running surface in cross-section is at least region-wise of a convex, particularly preferably circular, configuration. By virtue of such a configuration on the one hand the contact surface between the at least one load rolling body and the at least one load-transmitting running surface can be minimized. On the other hand, it is possible, if the at least one load rolling body has a groove at its periphery, to achieve engagement of the at least one load-transmitting running surface into the at least one load rolling body. That can still further improve lateral guidance.

It is further appropriate if the at least one load-transmitting running surface is provided at at least one insert portion separate from the at least one rail profile, preferably wherein the at least one insert portion is cylindrical.

And, finally, it has been found desirable if the arrangement includes at least one carriage hinge which is or can be connected to the at least one carriage and the sliding door and by way of which the sliding door is pivotable with respect to the at least one carriage, preferably about an axis which is vertical in the mounted position.

As stated in the introductory part of this specification, protection is also sought for an article of furniture comprising at least one sliding door and at least one arrangement according to the invention. Preferably, the article of furniture has a particularly preferably shaft-shaped hollow space for receiving the at least one sliding door, and the hollow space extends substantially transversely relative to the at least one rail profile into the interior of the article of furniture.

In a preferred embodiment, the at least one sliding door has at least two hingedly interconnected door leaves, and the at least two door leaves are moveable between a parallel position in which the at least two door leaves are oriented in substantially mutually parallel relationship and a coplanar position in which the at least two door leaves are oriented in substantially coplanar relationship. The angle position of the at least one carriage in relation to the pivot axis changes upon a movement of the at least two door leaves between the parallel position and the coplanar position.

In this connection, advantageously the inclination of the at least one carriage with respect to a vertical position in the coplanar position of the at least two door leaves is greater than in the parallel position of the at least two door leaves.

BRIEF DESCRIPTION OF THE DRAWINGS

Further details and advantages of the invention will be described more fully hereinafter in the description of the figures with reference to the drawings in which.

DETAILED DESCRIPTION OF THE INVENTION

Figure 1:
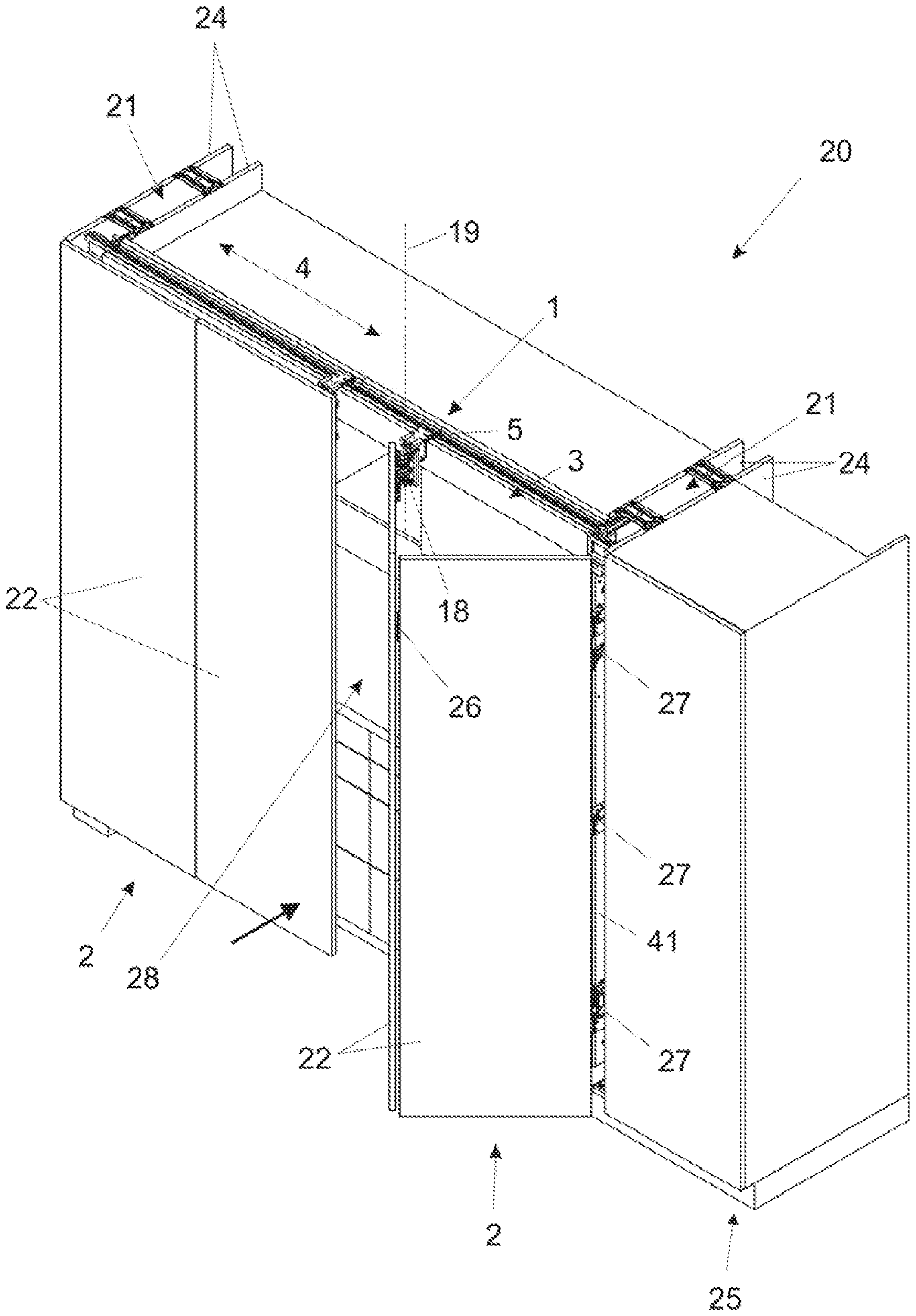
FIG. 1 shows a preferred embodiment of an article of furniture having two sliding doors which are moveable by way of an arrangement according to the invention, in a diagrammatically illustrated perspective view.

FIG. 1 shows a preferred embodiment of an article of furniture 20 comprising two sliding doors 2 moveable by way of an arrangement 1 according to the invention. Details of the arrangement 1 which includes a rail profile 3 and for each sliding door 2 a respective carriage 5 mounted displaceably relative to the rail profile 3 in the longitudinal direction 4 are described in the course of the description of FIGS. 3*a*-5*b*.

The sliding doors 2 each include two hingedly interconnected door leaves 22, wherein the two door leaves 22 are moveable between a parallel position in which the two door leaves 22 are oriented in substantially parallel relationship and a coplanar position in which the two door leaves 22 are oriented in substantially coplanar relationship. The sliding door 2 shown in the Figure on the left-hand side is arranged in the coplanar position. The right-hand sliding door 2 is in an intermediate position in which the two door leaves 22 include an angle of about 90° relative to each other. When the door leaves 22 are further pushed together towards the right they reach the parallel position. The sliding door 2 is folded together in the parallel position and the two door leaves 22 form a door pack. When the two sliding doors 2 are in the coplanar position the article of furniture 20 is closed outwardly.

By way of example as in the illustrated case components of a kitchen 28 or even a complete kitchen 28 can be arranged in the interior of the article of furniture 20. Further articles of furniture, for example a tall cupboard 25, can be arranged adjacent to the article of furniture 20.

The door leaves 22 can be connected together by way of one or more door hinges 26.

The invention is not limited to two sliding doors 2 with two door leaves 22. For example it is also possible to use only one sliding door 2 and/or a sliding door 2 with only one door leaf 22.

In the illustrated embodiment the article of furniture 20 includes two hollow spaces 21 in the form of a shaft for accommodating a respective sliding door 2, wherein the spaces 21 extend substantially transversely to the rail profile 3 into the interior of the article of furniture 20. The spaces 21 can be delimited by side walls 24 as in the illustrated case.

In the case of a sliding door 2 which has two hingedly interconnected door leaves 22 it is appropriate if the sliding door 2 can be moved starting from the parallel position of the door leaves 22 into a position of being sunk in the hollow space 21 in the form of a shaft.

It is further appropriate to provide a carrier 41 on which the sliding door 2 is moveably mounted. Carrier hinges 27 can be provided to give moveable mounting.

There can be provided one or more guides which are separate from the rail profile 3 and by way of which the carrier 41 is moveable in the hollow space 21. The guides extend transversely relative to the rail profile 3 and can be arranged at one of the or a plurality of side walls 24 which delimit the hollow space 21.

Viewed overall the sliding doors 2 in the illustrated case are respectively on the one hand mounted moveably on the rail profile 3 by way of a carriage 5 and on the other hand are connected to a carrier 41 moveable in the hollow space 21. A respective carriage hinge 18 can be provided on the respective carriage 5 for fixing the sliding doors 2, by way of which hinge 18 the sliding doors 2 are pivotable about a vertical axis 19 relative to the carriage 5.

When the sliding door 2 is sunk in the hollow space 21 in the parallel position of the door leaves 22 the carriage 5 is uncoupled from the rail profile 3.

Embodiments are also possible in which for example a continuous rail profile 3 is used, which extends by way of a curve into the hollow space 21. In that case it is possible to dispense with the use of a carrier 41, separate guides for the carrier 41, and/or uncoupling of the carriage 5 from the rail profile 3.

Figure 2:
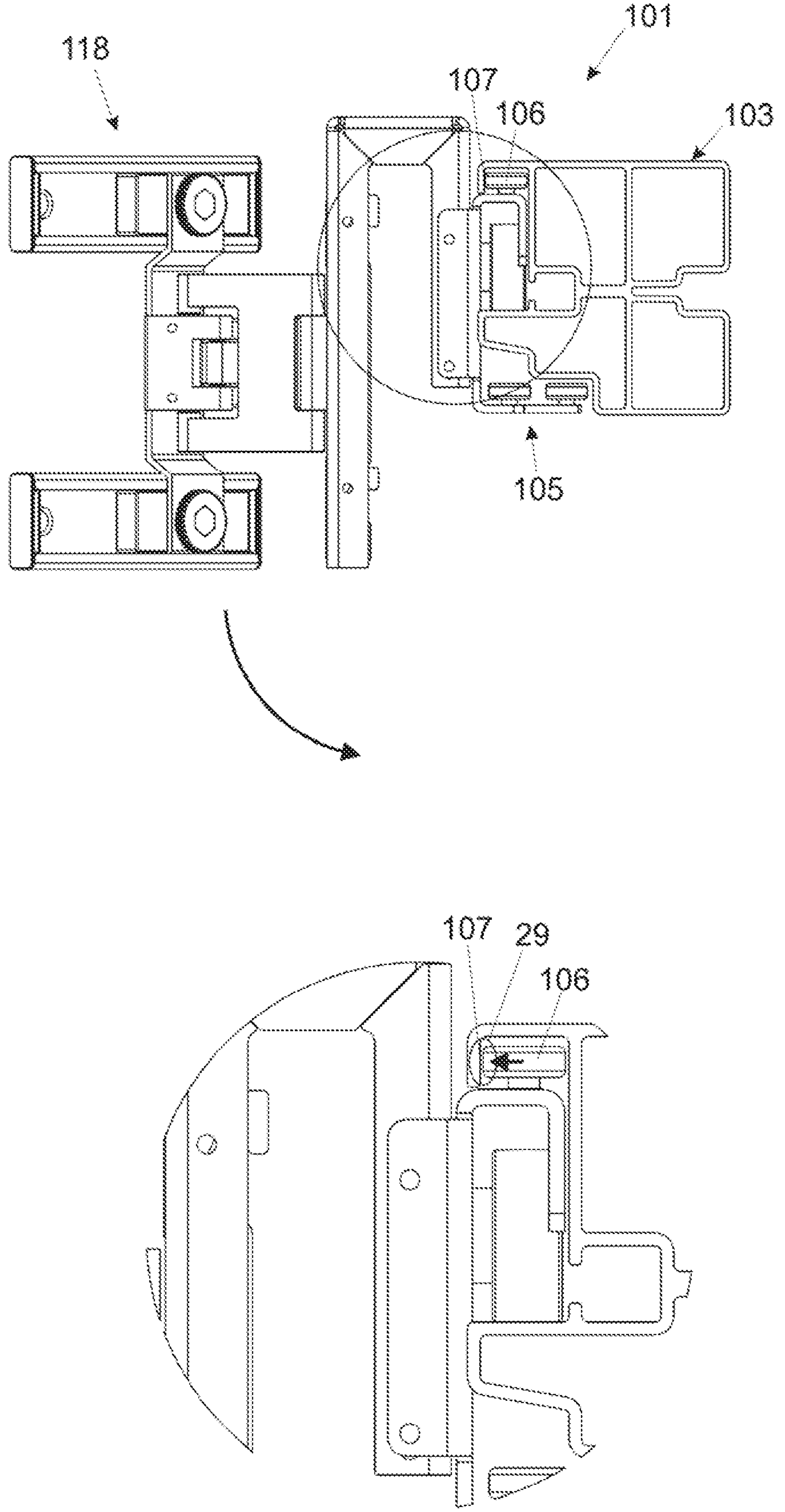
FIG. 2 is a side view of an arrangement according to the state of the art.

As described in the introductory part of this specification in connection with FIG. 2 the sliding doors 2 endeavor under the influence of the force of gravity in their lower region to pivot inwardly, that is to say in the direction of the interior of the article of furniture. That situation is indicated by an arrow in FIG. 1 in relation to the left-hand sliding door 2.

That endeavor is pronounced to differing degrees depending on the respective position of the two door leaves 22. More specifically the sliding doors 2 in the coplanar position have a more greatly pronounced tendency to pivot inwardly than in the parallel position. The tendency can also be pronounced to differing degrees in the course of the movement of the sliding doors 2 between those two positions.

FIG. 2 shows an arrangement according to the state of the art. That arrangement from which the present invention is distinguished has already been described in the introductory part of this specification.

FIGS. 3*a* to 4*c* show a first preferred embodiment of the arrangement 1 according to the invention for guiding a sliding door 2.

The arrangement 1 includes a rail profile 3 and a carriage 5 which is mounted displaceably relative to the rail profile 3 in the longitudinal direction 4 and to which the sliding door 2 can be fixed, wherein the carriage 5 has a rolling body 6 and the rail profile 3 has a running surface 7 which extends in the longitudinal direction 4 of the rail profile 3 and on which the rolling body 6 is supported. In that case the rolling body 6 is displaceable on the running surface 7 transversely to the longitudinal direction 4 of the rail profile 3 so that the carriage 5 is pivotable about a pivot axis 8 extending substantially parallel to the longitudinal direction 4 of the rail profile 3 (see in particular FIGS. 4*a* to 4*c*).

The rail profile 3 has two delimitation profiles 10, 11 which delimit the running surface 7 transversely to the longitudinal direction 4 of the rail profile 3.

The rolling body 6 is of a substantially cylindrical configuration.

Figure 4A:
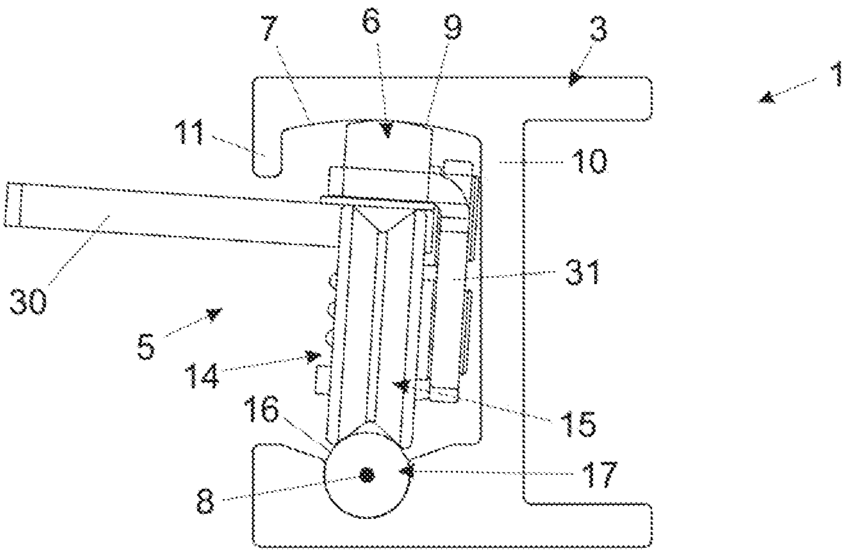
FIGS. 4*a*-4*c* show the first preferred embodiment in a diagrammatically illustrated cross-sectional view, wherein the carriage is pivoted to differing degrees about the pivot axis.
Figure 4B:
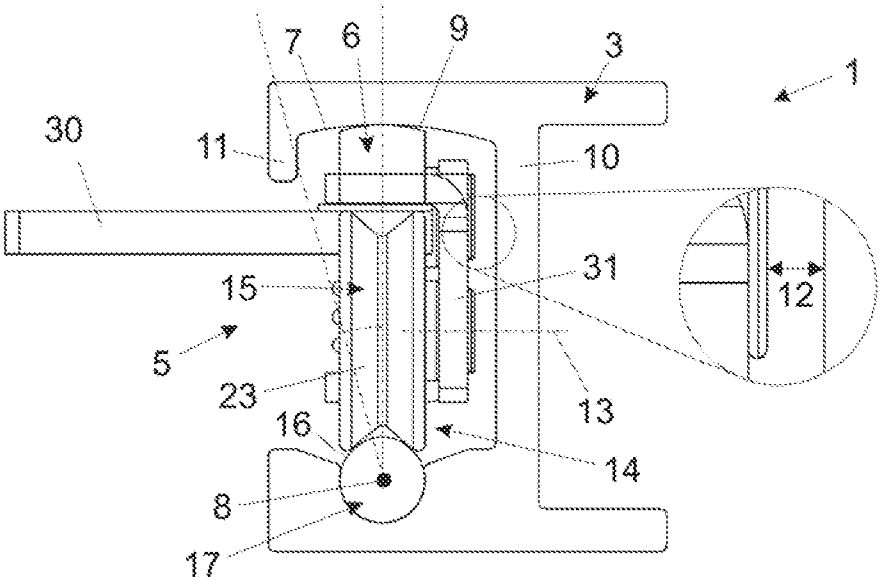
Figure 4C:
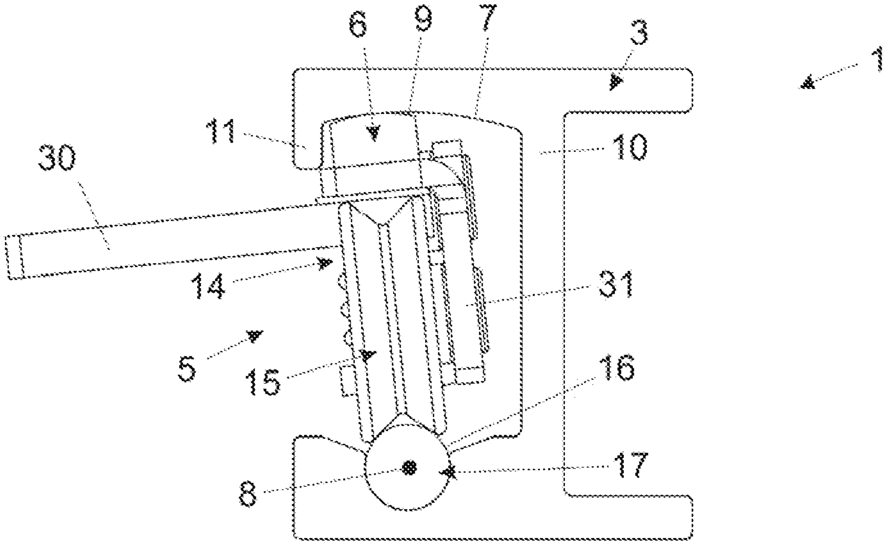

The carriage 5 has two load rolling bodies 14 for supporting the weight of a sliding door 2 fixed to the carriage 5, wherein the load rolling body 14 has a groove 15, more precisely a V-groove, in cross-section at its periphery, which can be particularly clearly seen from the cross-sectional views in FIGS. 4*a* to 4*c*.

The rail profile 3 has a load-transmitting running surface 16 on which the load rolling bodies 14 are supported, wherein the load-transmitting running surface 16 is of a convex, more precisely circular, configuration in cross-section.

As in the illustrated case the load-transmitting running surface 16 can be provided on an insert portion 17 which is provided separately from the rail profile 3, the insert portion 17 being cylindrical.

Figure 3A:
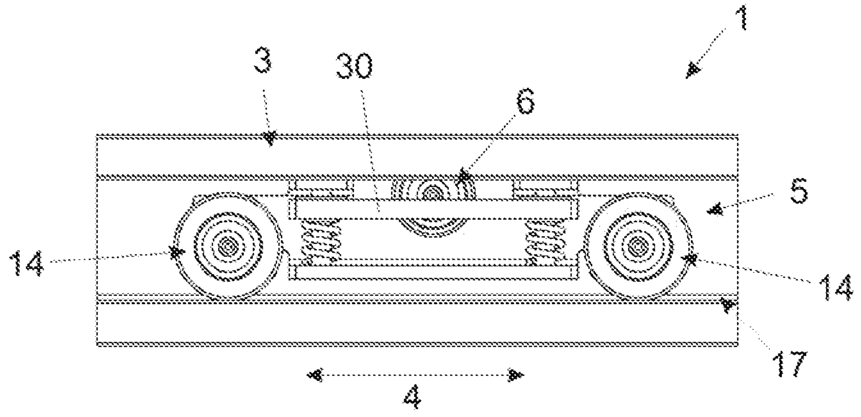
FIGS. 3*a*-3*c* show a preferred embodiment of the arrangement according to the invention in a diagrammatically illustrated side view (FIG. 3*a*), a diagrammatically illustrated perspective view (FIG. 3*b*) and a diagrammatically illustrated exploded view (FIG. 3*c*)
Figure 3B:
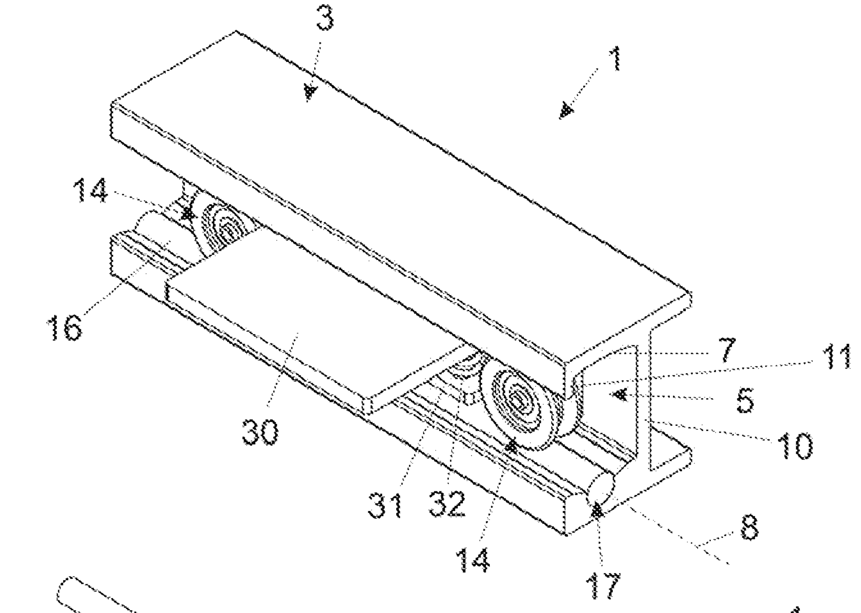
Figure 3C:
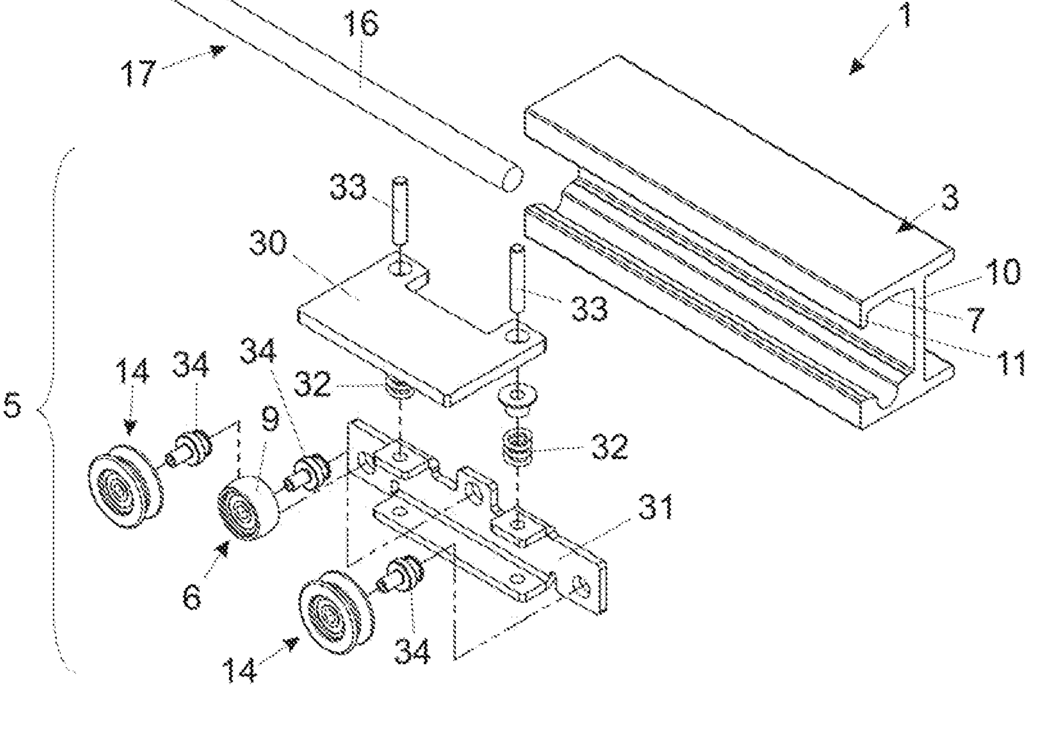

As can be seen in particular from the exploded view in FIG. 3*c* the carriage 5 can include a main structure 31, to which the rolling body 6 and the load rolling body 14 are mounted rotatably by way of rolling body bearings 34. In addition there can be provided a fixing profile 30 for directly or indirectly fixing the sliding door 2. One or more springs 32 can be provided between the fixing profile 30 and the main structure 31. It is appropriate to mount the springs on guide pins 33.

As can be seen in particular from FIGS. 4*a* to 4*c* the running surface 7 is of a concave configuration in cross-section. At the same time the rolling body 6 has a peripheral surface 9, by way of which the rolling body 6 is supported region-wise on the running surface 7, the peripheral surface 9 being of a convex configuration in cross-section.

FIG. 4*b* shows a neutral position of the carriage 5. When that position is compared to the position shown in FIG. 4*c* it can be established that the rail profile 3 has a vertical web 10 which extends in the longitudinal direction 4 and which delimits the running surface 7 transversely to the longitudinal direction 4 of the rail profile 3, the web 10 being oriented substantially perpendicularly to the running surface 7, wherein the carriage 5 is pivotable about the pivot axis 8 in such a way that a spacing 12 relative to the vertical web 10 increases in a state of being loaded by the sliding door 2.

At the same time, as a comparison with FIG. 4*a* shows, it can be provided that the carriage 5 is pivotable in the opposite direction.

Overall it can be provided that the carriage 5, starting from a neutral position which the carriage 5 assumes at least in a state of being non-loaded by the sliding door 2, is pivotable about the pivot axis 8 in an angle range of +10° and −5°. The angle in question is indicated by reference 23 in FIG. 4*b*.

As can also be seen from FIG. 4*b* the rolling body 6 is mounted to the carriage 5 rotatably about an axis of rotation 13 extending substantially perpendicularly to the pivot axis 8, wherein the axis of rotation 13 is oriented substantially horizontally in the mounted state.

In relation to FIG. 1 it was already indicated that the angle position of the carriage 5 in relation to the pivot axis 8 can alter upon a movement of the two door leaves 22 between the parallel position and the coplanar position.

In specific terms the inclination of the carriage 5 with respect to a vertical position in the coplanar position of the two door leaves 22 is greater than in the parallel position of the two door leaves 22.

Figure 5A:
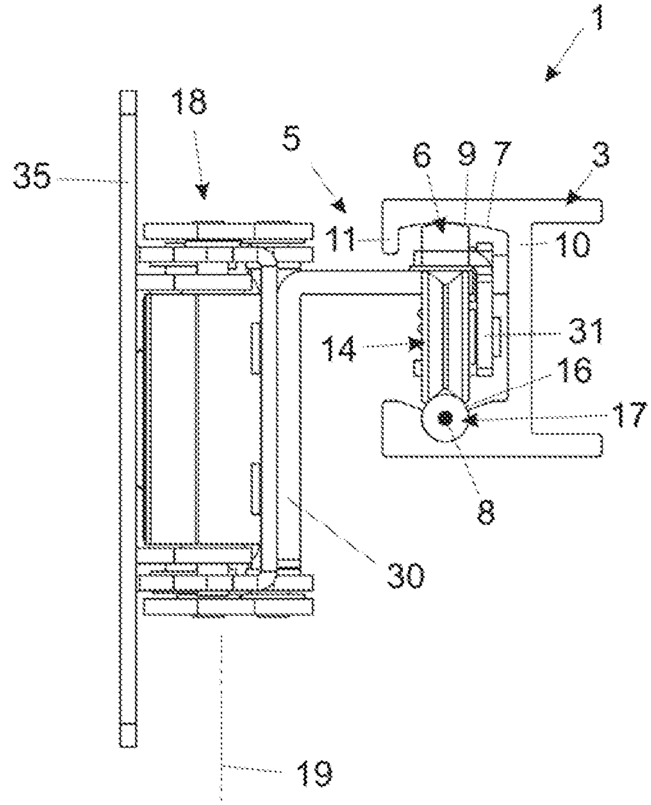
FIGS. 5*a*, 5*b* show a second preferred embodiment of the arrangement according to the invention in a diagrammatically illustrated side view (FIG. 5*a*) and a diagrammatically illustrated perspective view (FIG. 5*b*).
Figure 5B:
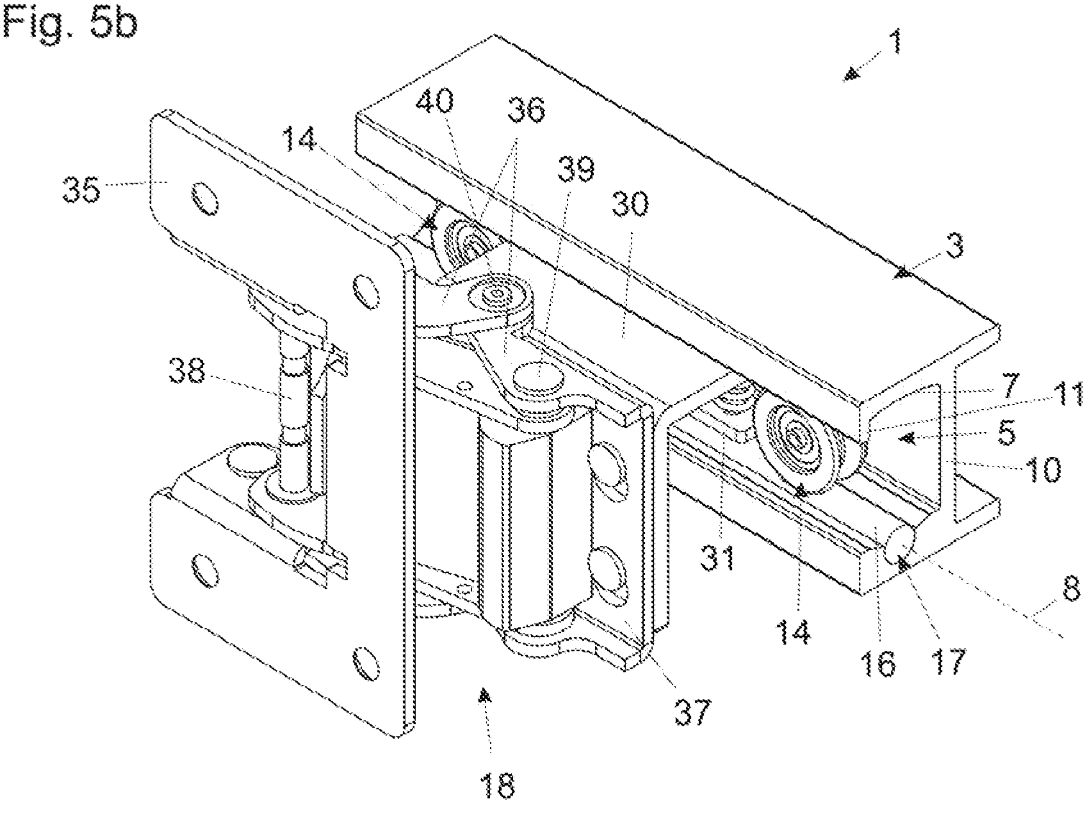

FIGS. 5*a* and 5*b* show a second preferred embodiment of the arrangement 1 according to the invention. The arrangement 1 includes a carriage hinge 18 which is or can be connected to the carriage 5 and to the sliding door 2 and by way of which the sliding door 2 is pivotable with respect to the carriage 5, more specifically about an axis 19 which is vertical in the mounted state (see also FIG. 1).

As in the illustrated case the carriage hinge 18 can include a mounting plate 35 for mounting to the sliding door 2. The mounting plate 35 is hingedly connected by way of hinge levers 36 to a fixing interface 37, wherein the fixing interface

37 serves for connecting the carriage hinge 18 to the carriage 5. The carriage hinge 18 has a plurality of hinge axes 38, 39, 40.

The invention claimed is:

1. An arrangement for guiding a sliding door, including comprising:

a rail profile; and a carriage mounted displaceably relative to the rail profile in the longitudinal direction and to be fixed to the sliding door, wherein the carriage has a rolling body and the rail profile has a running surface extending in the longitudinal direction 4 of the rail profile and on which the rolling body is supported, wherein the rolling body is displaceable on the running surface in a direction transverse to the longitudinal direction of the rail profile so that the carriage is pivotable about a pivot axis extending substantially parallel to the longitudinal direction of the rail profile, wherein the rail profile has a vertical web extending in the longitudinal direction and oriented substantially perpendicularly to the running surface, wherein the carriage is pivotable about the pivot axis such that a spacing relative to the vertical web increases in a state of being loaded by the sliding door.

2. The arrangement as set forth in claim 1, wherein the running surface is at least partially concave in cross-section.

3. The arrangement as set forth in claim 1, wherein the rail profile has a delimitation profile which delimits the running surface in the direction transverse to the longitudinal direction of the rail profile.

4. The arrangement as set forth in claim 1, wherein the carriage is pivotable about the pivot axis within an angle range of +15° and −10° starting from a neutral position of the carriage in a state of being non-loaded by the sliding door.

5. The arrangement as set forth in claim 4, wherein the carriage is pivotable about the pivot axis within an angle range of +10° and −5°.

6. The arrangement as set forth in claim 1, wherein the rolling body is substantially cylindrical.

7. The arrangement as set forth in claim 1, wherein the rolling body is mounted to the carriage rotatably about an axis of rotation extending substantially perpendicularly to the pivot axis, wherein the axis of rotation in the mounted state is oriented substantially horizontally.

8. The arrangement as set forth in claim 1, wherein the carriage has a load rolling body for supporting a weight of the sliding door to be fixed to the carriage.

9. The arrangement as set forth in claim 8, wherein the rail profile has a load-transmitting running surface at which the load rolling body is supported.

10. The arrangement as set forth in claim 9, wherein the load-transmitting running surface is located at an insert portion separate from the rail profile.

11. The arrangement as set forth in claim 10, wherein the insert portion is cylindrical.

12. The arrangement as set forth in claim 9, wherein the load-transmitting running surface in cross-section is at least partially convex.

13. The arrangement as set forth in claim 12, wherein the convex load-transmitting running surface in cross-section is at least partially circular-shaped.

14. The arrangement as set forth in claim 8, wherein the load rolling body has a peripheral groove.

15. The arrangement as set forth in claim 14, wherein the groove is a V-shaped groove in cross-section.

16. The arrangement as set forth in claim 1, further comprising a carriage hinge to be connected to the carriage and the sliding door to allow the sliding door to pivot with respect to the carriage.

17. The arrangement as set forth in claim 16, wherein the carriage hinge is configured to allow the sliding door to pivot about an axis vertical.

18. An article of furniture comprising:

a furniture body;

a sliding door; and the arrangement as set forth in claim 1 to allow the sliding door to move relative to the furniture body.

19. The article of furniture as set forth in claim 18, wherein the sliding door has at least two hingedly interconnected door leaves, the at least two door leaves being moveable between a parallel position, in which the at least two door leaves are oriented in a substantially mutually parallel relationship, and a coplanar position, in which the at least two door leaves are oriented in substantially coplanar relationship, the arrangement being configured such that an angle position of the carriage in relation to the pivot axis changes upon a movement of the at least two door leaves between the parallel position and the coplanar position.

20. The article of furniture as set forth in claim 19, wherein an inclination of the carriage with respect to a vertical position in the coplanar position of the at least two door leaves is greater than in the parallel position of the at least two door leaves.

21. The article of furniture as set forth in claim 18, wherein the furniture body has a hollow space for receiving the sliding door, the hollow space extending substantially transversely relative to the rail profile into an interior of the furniture body.

22. The arrangement as set forth in claim 1, wherein the vertical web delimits the running surface in the direction transverse to the longitudinal direction of the rail profile.

23. The arrangement as set forth in claim 1, wherein the rolling body has a peripheral surface by which the rolling body is at least partially supported on the running surface, and the peripheral surface is at least partially convex in cross-section.

24. The arrangement as set forth in claim 23, wherein the running surface is at least partially concave in cross-section.

* * * * *